April 24, 1951     M. H. LOGAN ET AL     2,549,830
PETROGRAPHIC SLIDE HOLDER
Filed Jan. 4, 1950
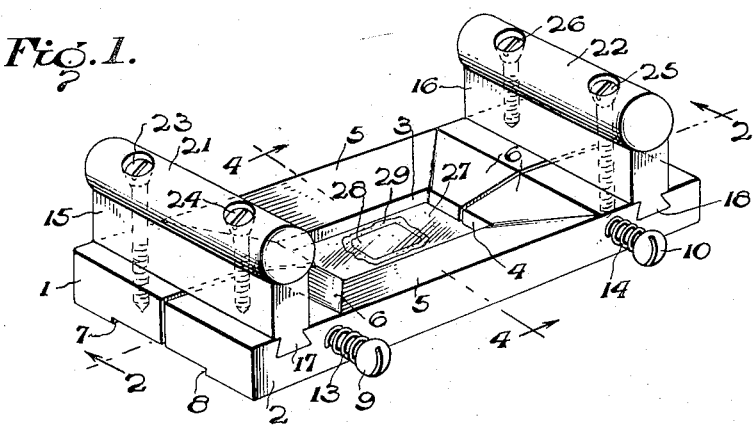
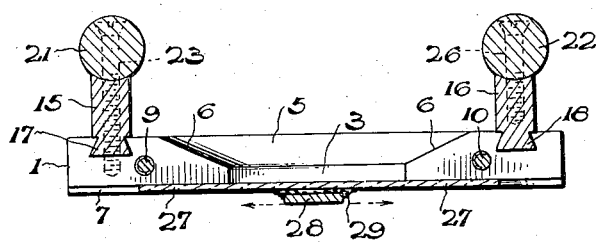
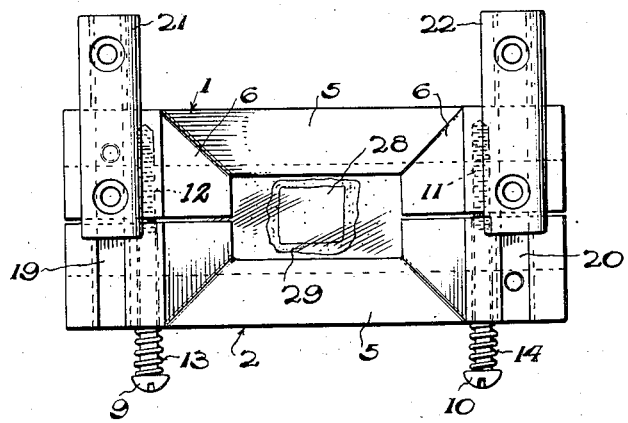
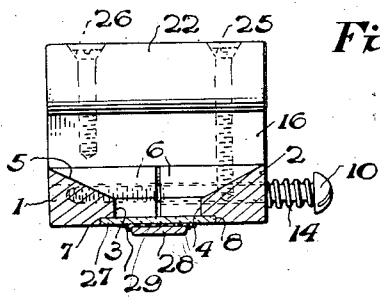
INVENTORS
Malcolm H. Logan
Albert O. Criswell.
BY Roy C. Hackley Jr.
ATTORNEY Patented Apr. 24, 1951

2,549,830

UNITED STATES PATENT OFFICE 2,549,830

PETROGRAPHIC SLIDE HOLDER

Malcolm H. Logan and Albert O. Criswell, Boise, Idaho

Application January 4, 1950, Serial No. 136,784

4 Claims. (Cl. 51—217)

(Granted under the act of March 3, 1883, as amended April 30, 1928; 370 O. G. 757)

The invention described herein may be manufactured and used by or for the Government of the United States for governmental purposes without payment to us of any royalty thereon in accordance with the provisions of the act of April 30, 1928 (ch. 460, 45 Stat. L. 467).

This invention relates to a holder for slides or plates utilized for holding specimens of various character for observation and for operations thereon. In the present instance, the invention as illustrated is a petrographic slide holder in which a glass plate or slide is held, the slide carrying a small rock specimen for the purpose of grinding or abrading the same to a desired thickness or condition for microscopic examination. The holder likewise provides for simultaneous observation of the specimen during the grinding or other operation thereon.

An object of the invention is to provide a holder of this character which is adaptable for use with slides of various dimensions.

Another object is the provision of a slide or plate holder adapted to retain the slide securely and yet with resilient effect so as to avoid fracturing or distortion thereof.

Another object is to provide a slide holder of this character which permits a maximum of observation upon and lighting of the object or specimen disposed on the slide.

Another object is the provision of a slide holder of simple construction, parts and adjustment; and adapted for assembly and disassembly in a minimum of time.

These and other objects are attained by the means described herein and illustrated in the accompanying drawings, in which:

Figure 1 is a perspective view of the invention in operative position and having associated therewith a slide bearing a rock or petrographic specimen.

Figure 2 is a cross-sectional view on the line 2—2 of Figure 1.

Figure 3 is a top plan view of the device of this invention with the handle means retracted from one side or bar of the slide holder.

Figure 4 is a cross-sectional view of the line 4—4 of Figure 1.

In greater detail and with reference to the drawings: the invention provides for a pair of relatively heavy metal bars 1 and 2, each of which is formed with a large lateral notch or opening 3 and 4, respectively. Each bar, on the upper side bordering the notch, is preferably of beveled formation to provide the sloping side and end faces 5 and 6, respectively.

The bottom face of each of the bars 1 and 2 is provided with a longitudinal ridge 7 and 8, respectively, which, as seen in Figures 3 and 4, may be formed by grooving the bottom face of each bar rearwardly from the notched side of the bar to a line extending inwardly a short distance beyond the inner side of the notch or opening 3 and 4. The two ridges 7 and 8 thus formed are for the purpose of holding between them the opposite edges of a slide or plate, as will be further described.

The two bars are adapted to be held in adjustable parallel adjacency with the openings of notches 3 and 4 in opposed relationship. For thus holding the bars, a pair of threaded bolts 9 and 10 may be utilized. These bolts pass freely through the bar 2, as will be noted in Figure 3, and are threadedly received as at 11 and 12 in the bar 1. Between the heads of the two bolts and the adjacent side of the bar 2, coil springs 13 and 14 are placed.

Handles for the cooperating bars 1 and 2 may take the form of a pair of cross pieces 15 and 16 formed along their lower edges with the dovetail extension, 17 and 18, respectively, adapted to fit into conforming slots 19 and 20, respectively (Figures 1 and 3), which extend in endwise alignment across both of the bars 1 and 2. The cross pieces 15 and 16 project through said grooves across both top portions of the bars 1 and 2 and render the latter slidably adjustable relative to one another.

The top edge of each cross piece 15 and 16 is of arcuate or recessed formation for receiving the cylindrical top piece, 21 and 22, respectively. A long threaded bolt 23 extends downwardly through the top piece 21, the cross piece 22 and into the body of the bar 1. Adjacent the other end of the handle, a shorter threaded bolt 24 extends downwardly through the top piece 21 but terminates and is threadedly seated in cross piece 15, not extending, therefore, into the body of the bar 2. Alternately, at the other end of the device a long threaded bolt 25 extends through the top piece 22, the cross piece 16 and is threadedly seated in the body of the bar 2. At the other end of this handle, the shorter threaded bolt 26 extends only through the top piece 22 and into the cross piece 16.

In use, a slide or plate 27 of the usual type is positioned on the conforming bottom face portions of the bars 1 and 2, between the ridges 7 and 8, the threaded bolts 9 and 10 having first been loosened to permit such insertion. Thereafter, the said bolts are tightened to apply the desired amount of resilient pressure to the side edges of the slide 27 to hold it for the ensuing operation. It will be noted that the alternate arrangement of the threaded bolts 23, 24, 25, and 26, described above, permits the sliding of the bar 2 relative to the bar 1 in which latter the threaded adjustment bolts are seated. It also provides for the slidable movement of the handles, as illustrated in Figure 3, in the assembly and disassembly of the device.

The slide or plate 27 is adapted to have disposed on its bottom face a specimen 28 of the work to be operated on, the latter being held in place by a suitable wax or cementing medium indicated at 29.

It will also be noted that the notches or openings 3 and 4 of the two bars, when placed in the opposed relationship seen in Figures 1 and 3, form an ample opening for observation of the specimen as it is being operated upon. At the same time, the inwardly sloping faces 5 and 6 of the two bars 1 and 2 provide for a maximum of light upon the specimen during the operation. After the operation on the positioned specimen the slide is removed and another inserted. The adjustability of the bars 1 and 2 relative to one another make it possible for them to accommodate between them slides and plates of a considerable variation of dimension. Usually these slides are of reduced thickness, averaging 1.5 mm., making them, heretofore, quite difficult to hold during the mechanical and hand-grinding operation. Such difficulty is eliminated by this invention.

Modifications will suggest themselves upon consideration of the means herein disclosed and these are believed to be comprised within the spirit and scope of the invention.

What is claimed is:

1. A slide holder comprising a pair of bars each provided with a lateral opening and a flat bottom formed with a longitudinal ridge intermediate the sides of the bar, said bars being adapted to be disposed parallel with one another and with said openings in opposed relation, adjustable means for holding the bars in said position, means providing for resilient movement of the positioned bars relative to one another, and a transparent slide placed flat against said bottom faces and resiliently gripped between said ridges for holding on its under face a specimen to be worked on and simultaneously observed through the enlarged port provided by said opposed openings.

2. A slide holder comprising a pair of bars each provided with a lateral opening and a bottom formed with a longitudinal ridge intermediate the sides of the bar, said bars being adapted to be disposed parallel with one another and with said openings in opposed relation, adjustable means for holding the bars in said position, and a transparent slide placed against said bottom faces and gripped between said ridges for holding on its under face a specimen to be worked on and simultaneously observed through the enlarged port provided by said opposed openings.

3. A slide holder comprising a pair of bars each provided with a lateral opening and a bottom formed with a longitudinal ridge intermediate the sides of the bar, said bars being adapted to be disposed parallel with one another and with said openings in opposed relation, adjustable means for holding the bars in said position, means providing for resilient movement of the positioned bars relative to one another, a transparent slide placed against said bottom faces and resiliently gripped between said ridges for holding on its under face a specimen to be worked on and simultaneously observed through the enlarged port provided by said opposed openings, and handle means on the bars for holding the device in use.

4. A slide holder comprising a pair of bars each provided with a lateral opening and a bottom formed with a longitudinal ridge intermediate the sides of the bar, said bars being adapted to be disposed parallel with one another and with said openings in opposed relation, adjustable means for holding the bars in said position, means providing for resilient movement of the positioned bars relative to one another, a transparent slide placed against said bottom faces and resiliently gripped between said ridges for holding on its under face a specimen to be worked on and simultaneously observed through the enlarged port provided by said opposed openings, a handle, and means for slidably positioning the handle transversely of the two bars.

MALCOLM H. LOGAN.
ALBERT O. CRISWELL.

REFERENCES CITED

The following references are of record in the file of this patent:

UNITED STATES PATENTS

| Number | Name | Date |
|---|---|---|
| 1,265,818 | Schmidt | May 14, 1918 |
| 1,402,046 | Bucey | Jan. 3, 1922 |
| 2,372,025 | Smith | Mar. 20, 1945 |